Patented Jan. 26, 1943

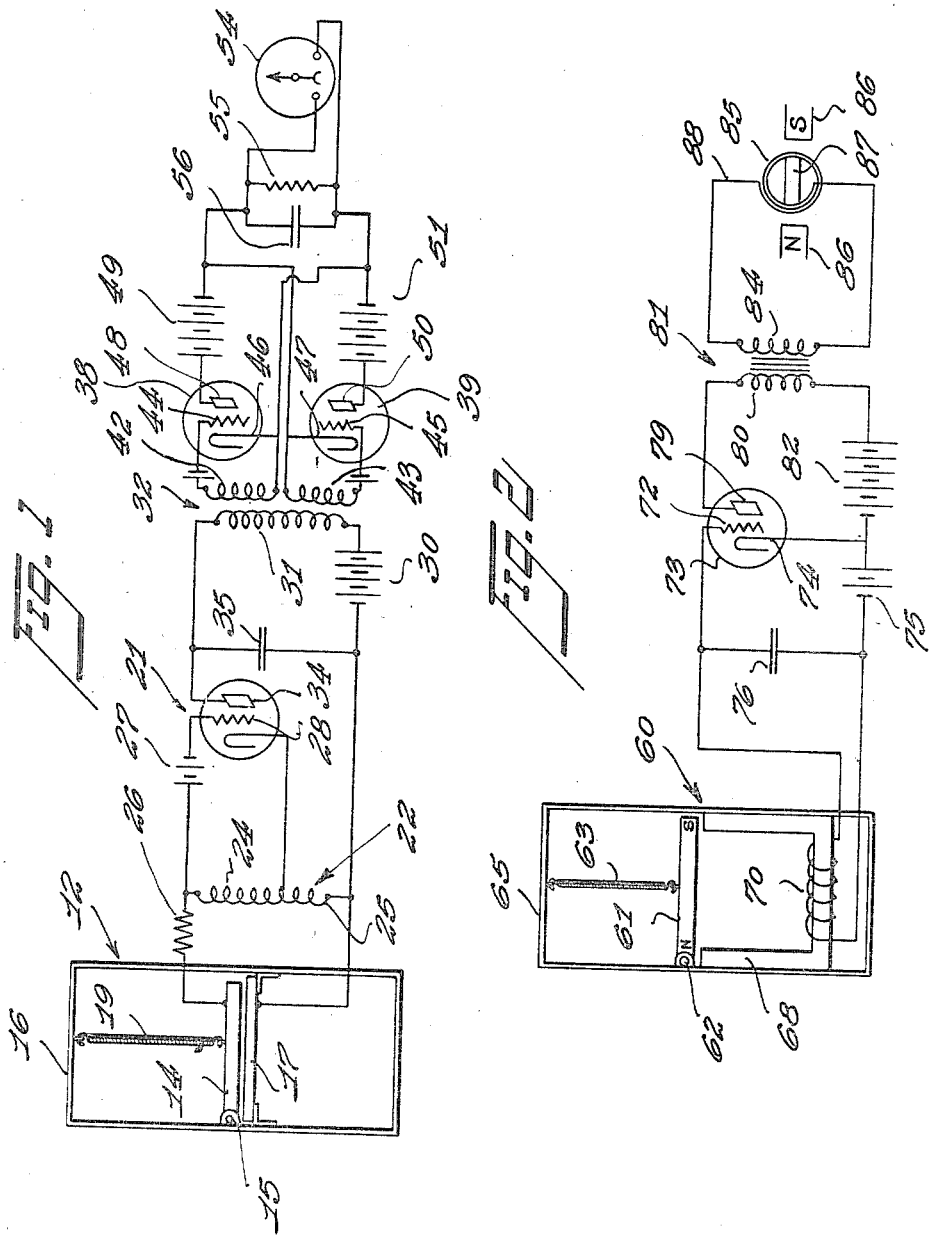

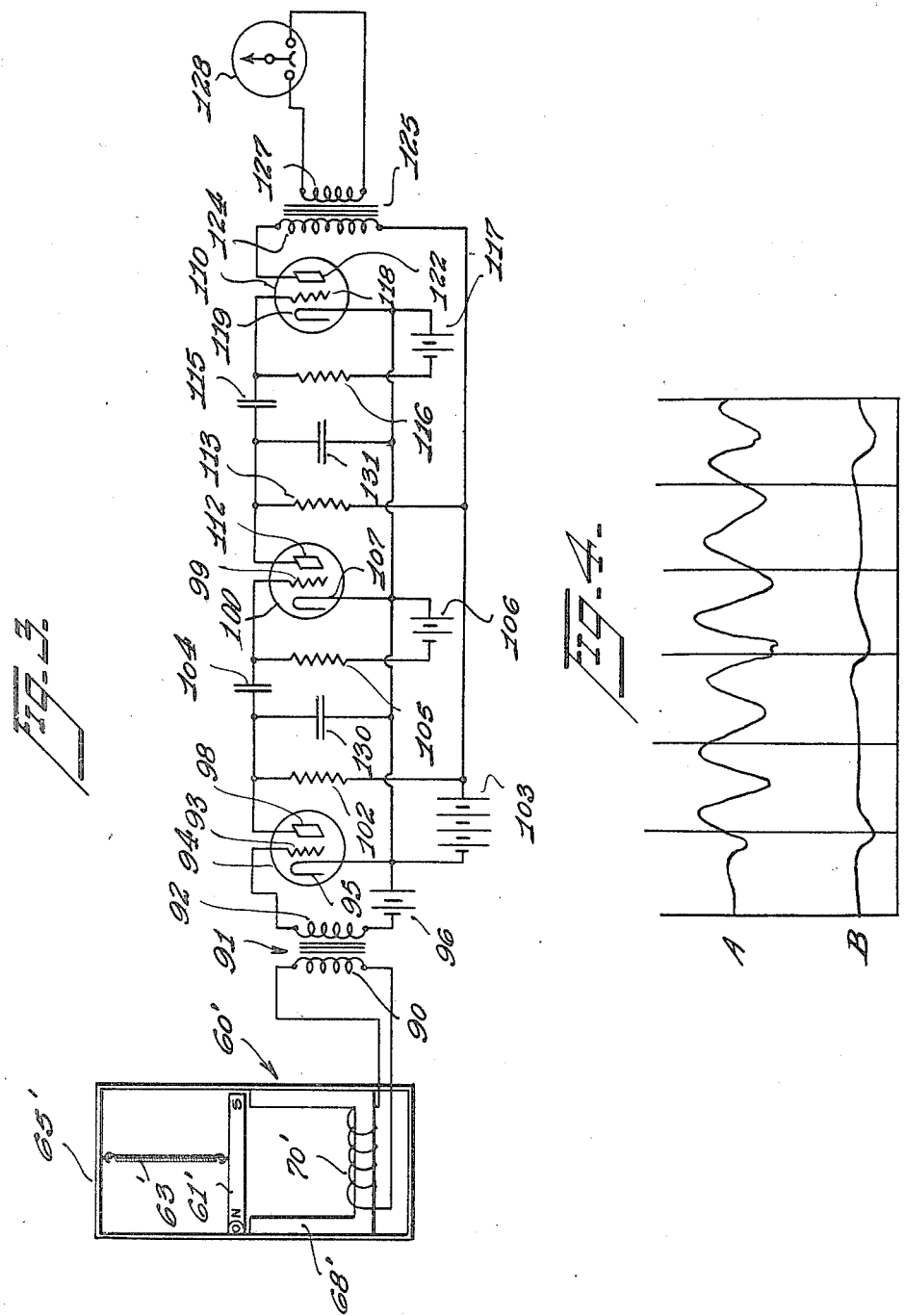

2,309,560

UNITED STATES PATENT OFFICE 2,309,560

METHOD AND APPARATUS FOR MEASURING AND RECORDING VIBRATIONAL EFFECTS

William Robertson Welty, San Antonio, Tex., assignor to Olive S. Petty, San Antonio, Tex.

Application March 18, 1940, Serial No. 324,668

3 Claims. (Cl. 171—95)

This invention relates to improvements in measuring devices and to apparatus for and methods of seismic surveying.

It is often desired to measure and record the extent of displacement of a vibrating body in which the vibrating movement is induced by a series of impulses imparted to the body at timed intervals. If the extent of displacement of the body is relatively small, it is possible to design an instrument employing what is sometimes referred to as a "steady-mass" which constitutes part of an elastic system of such low frequency as to be substantially unaffected by, although suspended from, the vibrating body. Measurement of absolute displacement of the body may thus be effected directed by observing relative displacement of the body and the steady-mass. In practice, however, it is usually quite difficult to establish such conditions, especially when the body is subjected to displacements of substantial amplitude or relatively low frequency.

For example, in the art of seismic surveying it is customary to measure and record seismic impulses by the use of devices variously referred to as seismometers, geophones, or detectors. These devices frequently employ an elastically suspended steady-mass, and theoretically it is possible to design an elastic system in which the mass is sufficiently large and the restoring force is sufficiently low to establish a condition such that relative displacement of the body and the steady-mass affords a fair measure of absolute displacement of the body. However, in seismic surveying, especially for refraction work, the impulses are of very low frequency, and a seismometer or detector having a much lower frequency, such as would be required to measure displacement, is a very delicate instrument such as can not be conveniently transported and handled without damage. Furthermore, many seismometers are of the so-called magnetic type, in which the seismic impulses are converted into pulsating electrical current by the cutting of magnetic lines of force, and the electrical output of such instruments therefore necessarily represents the rate of displacement, or the rate of change of displacement, rather than absolute displacement.

Again, it will be appreciated that if it is desired to form a record which is representative of the absolute displacement of a vibrating body in which the amplitude of vibration is large, for instance, the displacement of a vibrating airplane wing which may be measured in inches or even feet, the construction of an instrument embodying a mass which is elastically supported by the wing but which does not partake of movement with the wing, remaining substantially fixed in space, is clearly out of the question owing to the size of instrument which would be required to permit the necessarily large relative displacement between the mass and the wing.

For these and many other reasons it is desirable to provide a measuring device which is capable of delivering a signal representative of or generally proportional to velocity or acceleration of a vibrating body and subsequently to convert this signal so that it may approximately represent absolute displacement of the vibrating body. Such conversion is particularly useful in the field of seismic surveying, in which a record which more nearly represents absolute displacement of the ground is considerably simpler and easier to interpret than a record which is representative of velocity of movement or of acceleration of the ground. Such a record can be obtained, in accordance with the instant invention, with the use of measuring devices or seismometers which are sufficiently rugged to withstand ordinary handling without damage.

It can be shown that by a process of integration, energy which is representative of velocity of displacement can be converted into energy which is representative of absolute displacement. Similarly it can be shown that energy which is representative of acceleration can be converted into energy which is representative of velocity by integration and thence, by a second integrating step, to energy which is representative of displacement. This principle is utilized in accordance with the present invention to record vibrational energy in the form desired.

It is therefore an object of the instant invention to provide a method and apparatus whereby impulses applied to a vibrating body may be measured in terms either of the velocity or acceleration of the body, and subsequently converted by a process of integration to a more simple form of energy representative either of velocity or of absolute displacement of the body, and suitably recorded. More specifically, it is an object of the invention to provide a method of seismic surveying which includes the steps of receiving seismic impulses and converting the same into electrical energy representative of velocity or acceleration of the ground occurring as the result of the impulses, integrating such electrical energy at least once, and recording the energy in a form which is representative approximately of the absolute displacement or velocity of the ground.

The invention further contemplates the simultaneous recording of energy representative of different functions of the seismic impulses. Thus, for example, I may simultaneously record the initial electrical energy and the energy obtained by one or more steps of integration. For some purposes, it is found desirable to repeat the process of integration beyond that which is required to produce a signal generally representative of absolute displacement of the ground, and this also falls within the purview of the instant invention.

Further objects and features of the invention will be apparent from the following description, taken in connection with the accompanying drawings, in which—

Figure 1 is a diagrammatic view showing one form of circuit suitable for use in the practice of the invention;

Figure 2 is a similar view illustrating a modified arrangement;

Figure 3 illustrates still another circuit diagram; and

Figure 4 represents fragmentary portions of records.

In order to facilitate an understanding of the invention, several embodiments thereof have been shown in the accompanying drawings and specific language is employed to describe the same. It will nevertheless be understood that no limitation of the invention is thereby intended, and that various other modifications and alterations of the illustrated and described arrangements are contemplated such as embody the principles of the invention and fall within the scope of the claims appended hereto.

Turning now to Figure 1, it will be observed that the reference character 12 indicates generally a diagrammatic representation of a detector unit or seismometer of the so-called capacitive type, the essential elements of which comprise a movable plate 14, which may be hingedly supported at 15 on the casing 16, and a plate 17 which is fixed in the casing. A spring 19, connected between the movable plate 14 and the upper portion of the casing 16, constitutes with the plate 14 an elastic system, the plate being permitted to swing about its point of pivotal support and toward and away from the fixed plate 17, whereby the two plates function as a condenser of which the capacity is varied on vertical displacement of the casing 16.

It will be appreciated that the details of the structure thus far described form no part of the instant invention, and that the showing is wholly diagrammatic. Any suitable form of seismometer may be employed for the purpose. For example, the seismometer may be constructed in accordance with that disclosed in the application of Olive S. Petty, Serial No. 324,013, filed March 14, 1940.

The plates 14 and 17 are incorporated in the oscillating circuit of a three-element thermionic valve 21, the circuit also including an intermediate tapped inductance coil 22 having a portion 24 which may be described as a grid winding and a portion 25 which may be described as a plate winding. The grid winding 24 is electrically connected at its outer end through resistance 26 with plate 14 and is further connected through grid bias battery 27 to the grid 28 of the valve 21, the grid bias being so chosen that the valve operates on the non-linear portion of the $E_g$—$I_p$ curve thereof, for example near cut-off. The outer end of the plate winding 25 is electrically connected to the plate 17 and is further connected through a source of plate voltage 30 and the primary winding 31 of an output transformer 32 to the plate 34 of the valve 21. A condenser 35 is connected between the valve plate 34 and the outer end of the plate winding 25 to afford a path for pulsating current.

It will be appreciated that the circuit just described will oscillate at a frequency which is dependent upon the characteristics of the various elements included in the circuit. The inductance of the two parts of the coil 22, the value of the resistance 26, condenser 35, and other parts of the circuit are appropriately selected to provide a convenient resonance frequency for any desired spacing of the plates 14 and 17. Means may be provided to adjust the spacing between these plates to afford the desired frequency of oscillation, so that thereafter, with all of the other elements of the circuit remaining constant, any variation in the spacing of the plates will cause corresponding changes in the oscillation frequency. When the plates are in repose, the output of the circuit is a fixed high frequency pulsating direct current from the source 30 to the plate, and there is present in the grid winding 24 a high frequency alternating current of fixed amplitude. The changes in frequency of oscillation brought about by relative movement of the plates 14 and 17 alters the quantity of current flowing to the plate of the tube as more particularly described in the application of Olive S. Petty hereinbefore referred to.

It can be shown that if the elastic system constituted by the plate 14 and the spring 19 has a very low frequency, for example by the employment of a moving plate having a very considerable mass and a spring having a very small restoring force, the plate 14 will occupy a relatively fixed position in space while the casing 16 and the so-called fixed plate 17 are displaced with respect thereto in response to seismic impulses. It can also be shown that the modulation of the oscillating current in the circuit just described, under the conditions mentioned, will be approximately proportional to the absolute displacement of the casing 16 in response to the seismic impulses, and that a pulsating current representing such displacement will flow in the winding 31 of the transformer 32. In practice, however, it is exceedingly difficult to secure such results for various reasons. For example, it is obvious that a seismometer in which a very heavy mass is suspended by elastic means having only a small restoring force is insufficiently rugged to withstand ordinary handling.

It is nevertheless often desirable in the field of seismic surveying, as well as in other fields, to produce a record in which displacement of the record curve is proportional to or representative of absolute displacement of the casing of the seismometer. It is therefore proposed, in order to approximate such result, to provide a seismometer of the capacitive type in which the elastic system has a natural frequency approaching that of the frequency of the signals to be recorded, the system being sufficiently damped to prevent persistence of vibration at frequencies near resonance. It can be shown that with such an instrument, the modulation of the oscillating current in the circuit described is a pulsating current of which the amplitude is generally representative of the relative displacement of the plates 14 and 17, rather than of the absolute displacement of the casing 16, and, furthermore, that this relative displacement of plates 14 and 17 is proportional to the velocity of casing 16, which is that of the ground. The signal energy thus obtained is then integrated, and as hereinbefore explained, such integration modifies the record curve so that it is generally proportional to or representative of the absolute displacement of the casing 16. Thus, the seismometer may be constructed much more ruggedly and it is possible in practice to secure a representation of the absolute displacement produced by the seismic waves with the attendant advantages hereinbefore pointed out.

As mentioned above, the integration may be performed in various ways, and in the embodiment of the invention shown in Figure 1, the result is achieved by proper selection of the constants in the electrical circuit to which is fed the output of the oscillating circuit just described.

This further circuit may comprise a pair of thermionic valves 38 and 39 arranged in so-called push-pull relation. Thus, the secondary of the transformer 32 may comprise two windings 42 and 43, the outer ends of these windings being connected respectively to the grids 44 and 45 of valves 38 and 39, and the inner ends of these windings being connected respectively to the cathodes 46 and 47 of the valves. These valves 38 and 39 have such characteristics or are so biased that they act as rectifiers of the energy fed from transformer 32. Plate 48 of valve 38 is connected through a source 49 of plate voltage to the cathode 47 of valve 39, and plate 50 of valve 39 is similarly connected through a source 51 of plate voltage to the cathode 46 of the valve 38. The negative terminals of the sources 49 and 51 are connected to the terminals of a galvanometer 54, and across the galvanometer terminals are shunted a resistor 55 and a condenser 56.

It will be appreciated that with this construction a pulsating current is delivered alternately through the circuit including the galvanometer from the valves 38 and 39, the resistor 55 affording a connection between the plate voltage source for each valve and the cathode of that valve. It is important that the impedance of the condenser 56 should be quite low as compared with the impedances of the valves 38 and 39, the galvanometer winding, and the value of the resistor 55. Thus, on the occurrence of each current pulsation, the condenser 56 is charged, and this charge is permitted to leak off only very slowly. Consequently, the movable element of the galvanometer does not return to its original position in precise accordance with the current pulsations delivered to the primary of the transformer 32, but assumes at any instant a position which represents, approximately, the integral of the pulsating current output of the seismometer circuit.

The galvanometer is shown in Figure 1 by the conventional representation, and it is intended that any conventional high impedance type of galvanometer or recording device be employed, such as a cathode ray tube with electrostatic deflection plates. Since in the field of seismic surveying it is usually desired to record on one sheet seismic impulses received by a plurality of detectors or seismometers, a multiple string galvanometer is commonly used for the purpose, and this is found to be quite satisfactory with the circuit illustrated in Figure 1, provided a buffer stage offering relatively high impedance is introduced between the condenser 56 and galvanometer 54. By the use of an optical system, for projecting the movements of the galvanometer strings on a sensitized sheet which is displaced past the optical system at a predetermined rate of speed, a permanent record may be made of which the amplitude represents approximately the absolute displacement of a plurality of seismometers in response to seismic impulses.

It will be appreciated that it may be desirable to employ a seismometer or detector in which the elastic system including the steady-mass has a natural frequency of vibration considerably higher than the natural frequency of the seismic impulses, particularly in view of the difficulty of securing long natural periods in a vibrating system of this character. Thus, the seismometer may be so constructed that the natural frequency of the suspension system is very much greater than that of the seismic impulses, perhaps of the order of ten times or more, in which case it can be shown that the output of the circuit described will be constituted by wave-form energy having an amplitude which is generally representative of or proportional to the acceleration of the ground. If such an instrument is employed, it is still possible to obtain, if desired, a signal which is generally representative of or proportional to the absolute displacement of the ground, provided the output of the seismometer circuit is integrated twice. Thus, the arrangement shown in Figure 1 may be modified by the introduction of an additional circuit, such as is hereinafter more particularly described, which serves to effect initial integration of the signal energy, so that the second integrating step completes the conversion of the signal energy to the desired form. Again, the added integrated step may be performed by use of a recording instrument of suitable design, such as is hereinafter described.

Turning now to Figure 2, it will be observed that the detector or seismometer diagrammatically shown at 60 is of the so-called magnetic type in which displacement of a "steady-mass" with respect to the casing in which it is mounted alters the flux in a magnetic field to induce a pulsating current which is a function of the velocity of such relative displacement. It will be appreciated that any conventional type of magnetic seismometer or detector may be employed for the purpose and that no limitation of the scope of the invention is intended by the diagrammatic arrangement illustrated in this figure. A device suitable for the purpose is shown, for example, is the co-pending application of Olive S. Petty, Serial No. 318,739, filed February 13, 1940.

The figure shows a movable arm 61 comprising a magnetized metallic bar, pivoted at 62, and supported for displacement about such pivot by a spring 63 which, as in the form of the invention hereinbefore described, extends between the casing 65 and the movable member. Supported rigidly within the casing 65 is a generally U-shaped member 68 of magnetic material, such as soft iron, associated with which is a winding 70. When impulses are applied to the casing 65 so as to displace arm 61 with respect to the member 68, a current will be induced in the winding 70.

The terminals of the winding 70 are connected respectively to the grid 72 and cathode 74 of a thermionic valve 73, a suitable source 75 of grid potential being included in the circuit. A condenser 76 is arranged in shunt with the winding 70, for the purpose of integrating the signal energy, as hereinafter more fully explained.

The plate 79 of the valve 73 is connected through the primary winding 80 of a transformer 81, and a source 82 of plate voltage to the cathode 74 of the valve. The output of the secondary winding 84 is fed to the winding 85 of a galvanometer having pole pieces 86 affording a magnetic field for the winding. A mirror 87 may be carried by the winding so that the deflection of the galvanometer may be recorded by a suitable optical system.

It will be appreciated that the illustration of the galvanometer is diagrammatic and that no significance attaches to this particular type of galvanometer except that it is so constructed that the restoring force which tends to return the winding to the normal position of rest is extremely small, approaching zero as a limit. This result is readily achieved in a reflecting galvanometer of the type illustrated by suspending the winding 85 from a substantially torsionless thread 88. It will nevertheless be appreciated that many other types of galvanometer or recording device having a very small restoring force may be employed in lieu of that shown, without affecting the results.

As in the case of the condenser 56 of Figure 1, the condenser 76 of Figure 2 has a very low impedance as compared with the impedances of other elements in the circuit in which the condenser is introduced. Thus, the condenser 76 serves to integrate the output of the seismometer or detecting device, and if the latter is so constructed that the current output from the winding 70 is generally representative of or proportional to the acceleration of the casing 65, the output of the circuit containing the condenser 76, as applied to valve 73 and thence to the transformer 81, will be generally representative of or proportional to the velocity of motion of the casing 65. If, on the contrary, the output of the seismometer 60 is representative of the velocity of the motion of the casing, the output of the valve 73 at the transformer 81 will be substantially representative of the absolute displacement of the casing 65.

It can be shown that in a magnetic type of seismometer the induced signal is generally proportional to the velocity of displacement of the casing 65 if the natural frequency of the elastic system, including the arm 61 and spring 63, is quite low as compared with the natural period of the disturbing force. It is, however, much more convenient for reasons hereinbefore pointed out to provide an elastic system in which the natural frequency is substantially equal to that of the disturbing force, and in such a case the output of the seismometer is generally representative of acceleration of the casing 65.

Having integrated the signal energy from the seismometer so as to produce a signal which is representative of velocity, it is desirable to integrate again to obtain a signal which is representative of absolute displacement. This could be done by the use of an electrical circuit similar to either of the circuits shown in Figure 1, but may be effected by the use of a galvanometer of the type described with reference to Figure 2. Thus, if the restoring force in the galvanometer approximates zero, it can be shown that a second integration of the signal will be effected and that the swing of the galvanometer will be roughly representative of absolute displacement of the vibrating body.

Figure 3 illustrates a further embodiment of the invention employing a magnetic type of detector or seismometer, in which the output may be representative of acceleration of the vibrating body to be measured, and in which integration is performed by two electrical circuits, any conventional type of galvanometer or recording device being employed. Thus, as diagrammatically shown, the casing of the seismometer is represented at 65', the spring at 63', the pivoted magnet at 61', and the magnetic member at 68'. The output of the winding 70' is in this case delivered to the primary winding 90 of a transformer 91. The ends of the secondary winding 92 of the transformer 91 are connected respectively to the grid 93 and the cathode 95 of a valve 94, a suitable source 96 of grid bias potential being employed. The plate 98 of the valve 94 is connected to the grid 99 of a valve 100 by conventional resistance coupling, the usual condenser 104 and grid resistor 105 being provided, the latter being connected in series with a source 106 of grid bias voltage between the grid 99 and the cathode 107 of the valve 100.

The output of valve 100 is similarly delivered to valve 110 through conventional resistance coupling. Thus, the coupling circuit may comprise a plate resistor 113 connected between the plate 112 of the valve 100 and the plate voltage source 103, the condenser 115, and the grid resistor 116, the latter being connected in series with a source 117 of the grid bias voltage between the grid 118 and the cathode 119 of the valve 110. The plate 122 of the valve 110 is connected to one end of the primary winding 124 of a transformer 125, the other end of the winding being returned to the plate voltage source 103. The output of the secondary winding 127 of the transformer 125 is delivered to a galvanometer or suitable recording device 128.

In order that the signal energy output of the seismometer may be twice integrated for the purpose hereinbefore stated, each of the resisting coupling circuits is provided with a condenser which is shunted across the plate and the cathode, these condensers having a very low impedance as compared with the impedance of other elements of the circuit in which they are included, so that the charge applied to the condensers leaks off only slowly. Thus, condenser 130 is connected between the plate 98 and the cathode 95 of valve 94 while a similar condenser 131 is connected between the plate 112 and the cathode 107 of the valve 100. Since the impedance of condensers 130 and 131 is relatively low, the variation of voltage across these condensers is small as compared with the total voltages applied thereto, and the signal will accordingly be integrated. As the result of the double integration of the signal, a record may be produced by the device 128 which will be generally representative of or proportional to the absolute displacement of the vibrating body with which the seismometer 60' is associated, although the signal output of the seismometer may be representative of acceleration of such body.

As hereinbefore mentioned, the process of integration may be repeated indefinitely, and I find that for some purposes this is highly desirable. For example, by integration of energy which is generally proportional to displacement (which may be the results of preceding integrations) I may obtain a signal which is of considerable value and interest in problems involved in fields, such as soil mechanics and the like, such successively integrated energy being to some extent a measure of the energy required to move the medium in which the original impulses are propagated. Successive integrations may obviously be performed by cascading or multiplying to the desired extent the various integrating units described herein.

In Figure 4 is shown two record diagrams, these records being made with seismometers of different characteristics. The record designated A was derived from an instrument having a period of 2.36 seconds, while the record designated B was derived from an instrument having a period of .455 second. The elastic systems of both instruments were only slightly damped, requiring fifteen or twenty seconds to come to rest when disturbed. These records illustrate strikingly the superiority of an instrument having a very low natural frequency, from which energy generally representative of absolute displacement may be directly obtained. By means of the present invention, it is possible to derive records similar to that shown at A from an instrument having a relatively high natural frequency by successive electrical integration and at the same time to avoid the difficulties inherent in the construction and use of a low frequency instrument.

From what has been said, it will be apparent that the nature of the response of the seismometer is determined largely by the relation between the natural periods of the received impulses and of the elastic system embodied in the seismometer. Thus, it can be said that it is only with respect to impulses falling within a restricted band of frequencies that a seismometer will deliver an output which is representative of the velocity or of the acceleration of the body to which the impulses are applied. Furthermore, it will be apparent that as the natural period of the elastic system of the seismometer is varied, the nature of the energy output of the seismometer will accordingly vary, and may represent neither velocity nor acceleration, but some intermediate function. Therefore, the description of such output as representative of displacement, velocity, or acceleration is in any instance only generally correct, and the application of the instant invention to seismometers of which the output represents a mean between displacement and velocity or between velocity and acceleration is contemplated. In any event, considerable simplification of the record of the signal can be effected by integrating the signal once or successively so as to obtain a curve which is an approximation of or approaches a true displacement record. Thus, in its broadest aspect, the invention involves the integration of the signal output of any measuring device at least once and the recording of the integrated signal.

Having thus described my invention, what I claim as new is:

1. In apparatus for integrating and recording pulsating current, the combination with a transformer to which the current is fed, thermionic valves in push-pull relation, means delivering the output energy of said transformer to the control grids of said valves in opposed phase, a galvanometer having the winding terminals thereof connected to the respective anodes of said valves, and a condenser and resistor arranged in shunt across said terminals, the value of the condenser impedance being sufficiently low as compared with the value of the resistor, the impedance of the valves, and the galvanometer winding to effect approximate integration of the initial pulsating current.

2. In apparatus for integrating a pulsating current, the combination with a transformer to which the current is fed, thermionic valves in push-pull relation, means delivering the output energy of said transformer to the control grids of said valves in opposed phase, a winding having the terminals thereof connected to the respective anodes of said valves, and a condenser and resistor arranged in shunt across said terminals, the value of the condenser impedance being sufficiently low as compared with the value of the resistor, the impedance of the valves, and the winding to effect approximate integration of the initial pulsating current.

3. In apparatus for integrating a pulsating current, the combination with a transformer to which the current is fed, thermionic valves in push-pull relation, means delivering the output energy of said transformer to the control grids of said valves in opposed phase, a condenser in the path connecting the anodes of said valves, and means including an indicating device connected across said condenser, said last named means including a leakage path for the discharge of said condenser, the value of the condenser impedance being sufficiently low as compared with the impedance of the leakage path and of the valves to effect approximate integration of the initial pulsating current.

WILLIAM ROBERTSON WELTY.